W. H. Milhouse,
Washing Machine,
Nº 22,741. Patented Jan. 25, 1859.
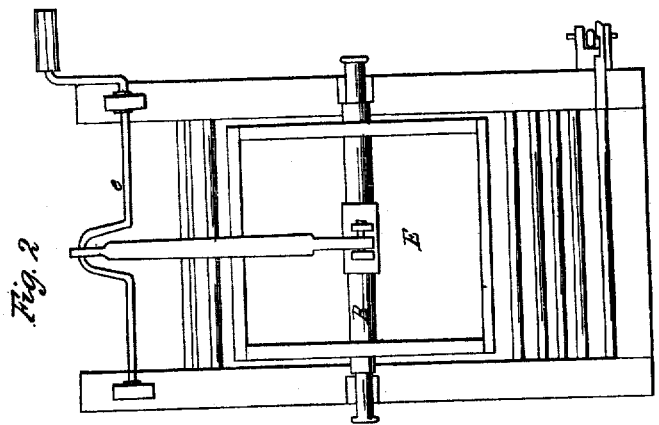
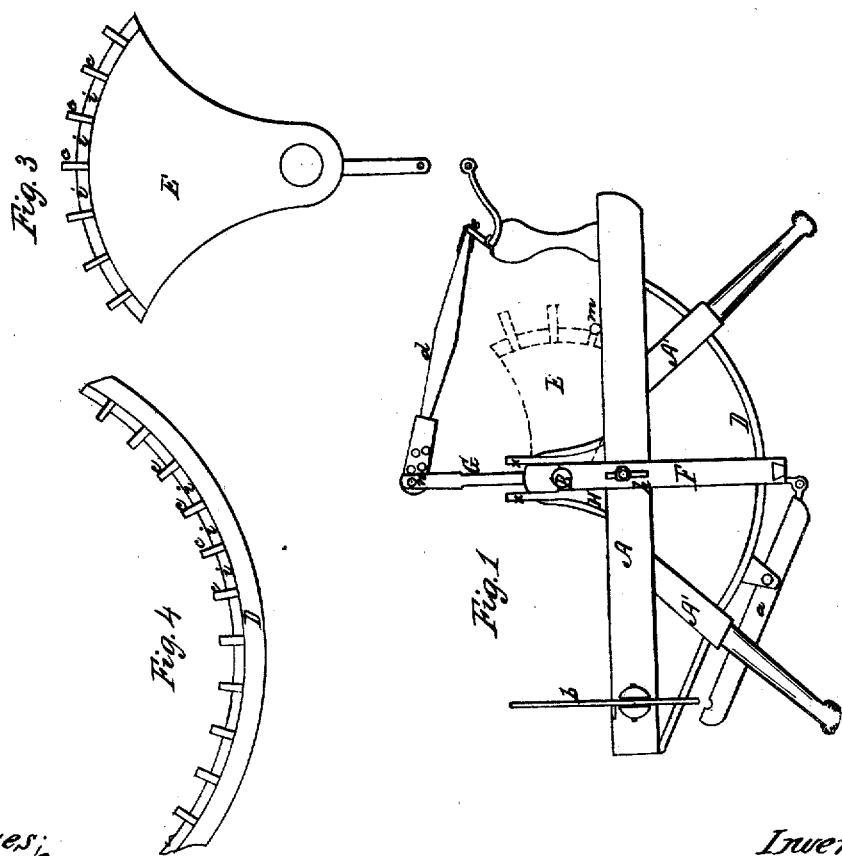
Witnesses:
Inventor:
Wm. H. Milhouse

UNITED STATES PATENT OFFICE.

WILLIAM H. MILHOUSE, OF SUGARTOWN, PENNSYLVANIA.

WASHING-MACHINE.

Specification of Letters Patent No. 22,741, dated January 25, 1859.

*To all whom it may concern:*

Be it known that I, WILLIAM H. MILHOUSE, of Sugartown, in the county of Chester and State of Pennsylvania, have invented certain new and useful Improvements in Washing-Machines; and I do hereby declare that the following is a full, clear, and exact description of the same, reference being had to the accompanying drawings and to the letters of reference marked thereon.

The nature of my invention consists in the manner of employing and securing the india rubber strips, together with the arrangement of the several parts which form the operative apparatus of the machine.

In the annexed drawings Figure 1 is a side elevation. Fig. 2 is a plan view. Figs. 3 and 4 represent detached views of the rubber and concave showing means of securing the india rubber strips.

A and A' represent the body and legs of the machine. The bottom of this body is in the form of a concave as shown in Figs. 1 and 4. D, represents said concave.

E, represents a rubber which is secured to a shaft B, said shaft having its bearings in the upright H, which has a proper opening for receiving said shaft. Said shaft also bears upon the top frame F.

F, represents a frame which has a slat $h$, through which a pin on the frame enters and allows of said frame being raised or lowered as may be required.

$a$ is a lever which connects with the bottom of frame F, and $b$ is a lever which operates lever $a$.

$d$, is a pitman which connects at one end with an arm on rubber E, and at the other with a crank on shaft $e$. By turning shaft $e$, a backward and forward or pendulous motion is communicated to the rubber E.

$c$, $c$, $c$ represent strips of india rubber which are placed edgewise on the rubber E, and concave D. $i$, $i$, $i$, are slats which are secured between these strips of india on the rubber E, and concave D. The india rubber being placed edgewise in slots in those parts mentioned the slats $i$, $i$, are pressed between the successive pieces of said rubber and are bolted or nailed in securely and thus secure the india rubber in its place, leaving that part of it which extends above the concave and below the rubber E, perfectly pliable and free to give at any spot where any firm obstacle presses against it without raising other parts of it above the clothes.

$m$ represents a pin which connects the arm G with pitman $d$.

When it is desired to remove the clothes from the concave the rubber E may be made to assume the position shown in red lines in Fig. 1 and the pin being inserted in a hole in the side of the rubber holds it in that position as long as may be desired. By the use of the lever $b$ the frame F may be raised or lowered to suit the bulk of clothes or to suit the pressure needed to wash or rub them.

I am aware that india rubber has been used before in washing machines, hence I do not lay any claim to the employment of it generally.

Having thus fully described my invention what I do claim as new and desire to secure by Letters Patent is—

1. Securing strips of india rubber edgewise in slots in the concave D, and rubber E, by means of the slats which are bolted in between the successive strips as is herein fully set forth.

2. The arrangement of the adjustable frame F, levers $a$ and $b$, swinging rubber E pitman $d$, and shaft $e$, with the concave, when the whole are combined constructed and operated in the manner and for the purpose herein set forth.

WM. H. MILHOUSE.

Witnesses:
C. M. ALEXANDER,
C. D. SMITH.